(12) United States Patent
Park et al.

(10) Patent No.: US 7,197,206 B2
(45) Date of Patent: Mar. 27, 2007

(54) OPTICAL COMMUNICATION SYSTEM AND METHOD THEREOF

(75) Inventors: Soon Jin Park, Seoul (KR); Tae Sang Park, Seoul (KR)

(73) Assignee: KT Corporation, Gyeonggi-Do (KR)

( * ) Notice: Subject to any disclaimer, the term of this patent is extended or adjusted under 35 U.S.C. 154(b) by 0 days.

(21) Appl. No.: 11/048,972

(22) Filed: Feb. 2, 2005

(65) Prior Publication Data
US 2005/0169574 A1    Aug. 4, 2005

(30) Foreign Application Priority Data
Feb. 4, 2004    (KR) .................... 10-2004-0007148

(51) Int. Cl.
*G02B 6/27* (2006.01)
*H01S 3/063* (2006.01)

(52) U.S. Cl. .......................... 385/28; 359/337
(58) Field of Classification Search ............. None
See application file for complete search history.

(56) References Cited

U.S. PATENT DOCUMENTS

| | | | |
|---|---|---|---|
| 5,729,372 A | | 3/1998 | Terahara et al. |
| 6,522,796 B1 * | | 2/2003 | Ziari et al. .............. 385/11 |
| 2002/0101650 A1 * | | 8/2002 | King et al. .............. 359/337 |

FOREIGN PATENT DOCUMENTS

| | | |
|---|---|---|
| EP | 0 268 523 A1 | 5/1988 |
| EP | 0 523 766 A1 | 1/1993 |

OTHER PUBLICATIONS

Buldawoo et al. "A Semiconductor Laser Amplifier-Reflector for the Future FTTH Applications" ECOC 97, Sep. 22-26, 1997, Conference Publication No. 448 (1997).

* cited by examiner

*Primary Examiner*—Michelle Connelly-Cushwa
*Assistant Examiner*—Jerry T. Rahll
(74) *Attorney, Agent, or Firm*—Merchant & Gould P.C.

(57) ABSTRACT

The present invention discloses an art for eliminating the dependency of the optical modulator on the polarization degree by using an orthogonal mode light which is a mixture of two lights that are perpendicular to each other in polarization direction as a light source. An optical communication system of the present invention comprises: a first optical generator and a second optical generator for generating a first single mode light and a second single mode light, respectively, wherein the first single mode light and the second single mode light are orthogonal and non-interfering with each other, and have the same wavelength; a mixing means for mixing the first single mode light and the second single mode light to output an orthogonal mode light; and an optical modulator for amplifying and modulating the orthogonal mode light after receiving the orthogonal mode light through an optical fiber so as to produce a constantly amplified optical signal regardless of a deflection degree of the orthogonal mode light.

6 Claims, 8 Drawing Sheets

OPTICAL COMMUNICATION SYSTEM AND METHOD THEREOF

BACKGROUND OF THE INVENTION

1. Field of the Invention

The present invention generally relates to an optical communication system using an optical modulator having polarization dependency, and more specifically, to a technology of removing non-uniform amplification factors of modulating signals of the optical modulator having polarization dependency by mixing two lights whose polarization directions are vertical each other and using them as a light source.

2. Description of the Drawings

FIG. 1 is a mimetic diagram illustrating a conventional optical communication system using an optical modulator having polarization dependency. Since a reflective semiconductor optical amplifier is usefully applied in a Wavelength Division Multiplexer-Passive Optical Network (hereinafter, referred to as "WDM-PON") as disclosed in "Semiconductor Laser Amplifier-Reflector for the Future FTTH Applications" (Vol. 2, p. 196) written by N. Buldawwo, S. Mottet, F. le Gall, D. Siggogne, D. Meichenin, S. Chelle in European Conference on Optical Communication, an example where the reflective semiconductor optical amplifier is used as an optical modulator having polarization dependency.

In general, the optical communication system comprises a light source 100, an optical circulator 200, a reflective semiconductor optical amplifier 300 and a photodiode 400.

An optical generator 110 in the light source 100 outputs a continuous wave (hereinafter, abbreviated as "CW") laser light $\lambda_s$ having a predetermined strength, and the representative example of the optical generator 110 is a Distributed Feedback Laser Diode (hereinafter, referred to as "DFB-LD"). The laser light $\lambda_s$ from the optical generator 110 is projected into the reflective semiconductor optical amplifier 300 through the optical circulator. Then, the reflective semiconductor optical amplifier 300 receives the laser light $\lambda_s$ to generate a modulated optical signal $\lambda_m$ that has the same wavelength as that of the projected laser light $\lambda_s$. The optical signal $\lambda_m$ modulated by the semiconductor optical amplifier 300 is inputted in the photodiode 400 through the optical circulator 200, and then transformed into an electric signal.

FIG. 2 is a diagram illustrating the operation principle of the reflective semiconductor optical amplifier 300 of FIG. 1. The projected light $\lambda_s$ inputted through the optical waveguide 310 is transmitted into the active layer waveguide 320, reflected in the high reflection coating film 330, and outputted to the optical waveguide 310 again. Here, while the projected light $\lambda_s$ is processed along the active waveguide 330, the projected light $\lambda_s$ is amplified depending on inputted signal current. Since a reflected output light copies the signal current, the reflective semiconductor optical amplifier 300 converts the light $\lambda_s$ into the upstream optical signal $\lambda_m$ having the same wavelength as that of the light $\lambda_s$.

Referring to FIG. 3, the active layer waveguide 320 has a quantum well structure which is formed of alternately deposited materials having a large energy band gap and a small energy band gap at tens of Ω. In this case, the state available in a Momentum space is two-dimensionally distributed, and the state depending on energy levels is intensively distributed in a specific energy level to increase photoelectric conversion efficiency. However, since a quantum well layer has its horizontal structure different from its vertical structure, the distribution in the momentum direction of excited electrons is directional. A light projected into the semiconductor optical amplifier having a quantum well structure has different photoelectric conversion efficiency depending on its polarization direction. That is, in general, optical amplification gain by the semiconductor optical amplifier having a quantum well depends largely on the polarization direction of the projected light.

For example, as shown in FIG. 4, the optical amplification gain is 20 dB when the projected light is vertically polarized while the optical amplification gain is 10 dB when the projected light is horizontally polarized.

Meanwhile, the laser light $\lambda_s$ generated from the optical generator 110 by duplicating photons has polarization because a polarization characteristic is also duplicated during the above generation process. As a result, when a single mode laser light having the polarization is used in an optical communication network, its polarization direction can be polarized due to distortion of an optical fiber. However, when the polarized laser light is inputted and then modulated in the reflective optical amplifier 300 having large polarization dependency of the optical amplification gain, the modulated optical signal has a difference of the optical amplification gain as described above, which causes instability of the optical transmission system.

SUMMARY OF THE INVENTION

Accordingly, it is an object of the present invention to provide an optical communication system which removes instability of optical transmission due to polarization dependency even when a reflective optical amplifier having large polarization dependency.

According to one aspect of the present invention, there is provided an optical communication system comprising: a first optical generator and a second optical generator for generating a first single mode light and a second single mode light, respectively, wherein the first single mode light and the second single mode light are orthogonal and non-interfering with each other, and have the same wavelength; a mixing means for mixing the first single mode light and the second single mode light to output an orthogonal mode light; and an optical modulator for amplifying and modulating the orthogonal mode light after receiving the orthogonal mode light through an optical fiber so as to produce a constantly amplified optical signal regardless of a deflection degree of the orthogonal mode light.

According to another aspect of the present invention, there is provided an optical communication method comprising: a first step of generating a first single mode light and a second single mode light, wherein the first single mode light and the second single mode light are orthogonal and non-interfering with each other, and have the same wavelength; a second step of mixing the first single mode light and the second single mode light to generate an orthogonal mode light; and a third step of receiving the orthogonal mode light through an optical fiber, and amplifying and modulating the received orthogonal mode light regardless of a deflection degree of the orthogonal mode light to produce a constantly amplified optical signal.

BRIEF DESCRIPTION OF THE DRAWINGS

Other aspects and advantages of the present invention will become apparent upon reading the following detailed description and upon reference to the drawings in which.

DETAILED DESCRIPTION OF THE PREFERRED EMBODIMENTS

The present invention will be described in detail with reference to the accompanying drawings. Herein, the same reference numbers and arrows will be used throughout the drawings and the following description to refer to the same parts shown in FIGS. 1 to 4.

Figure 1:
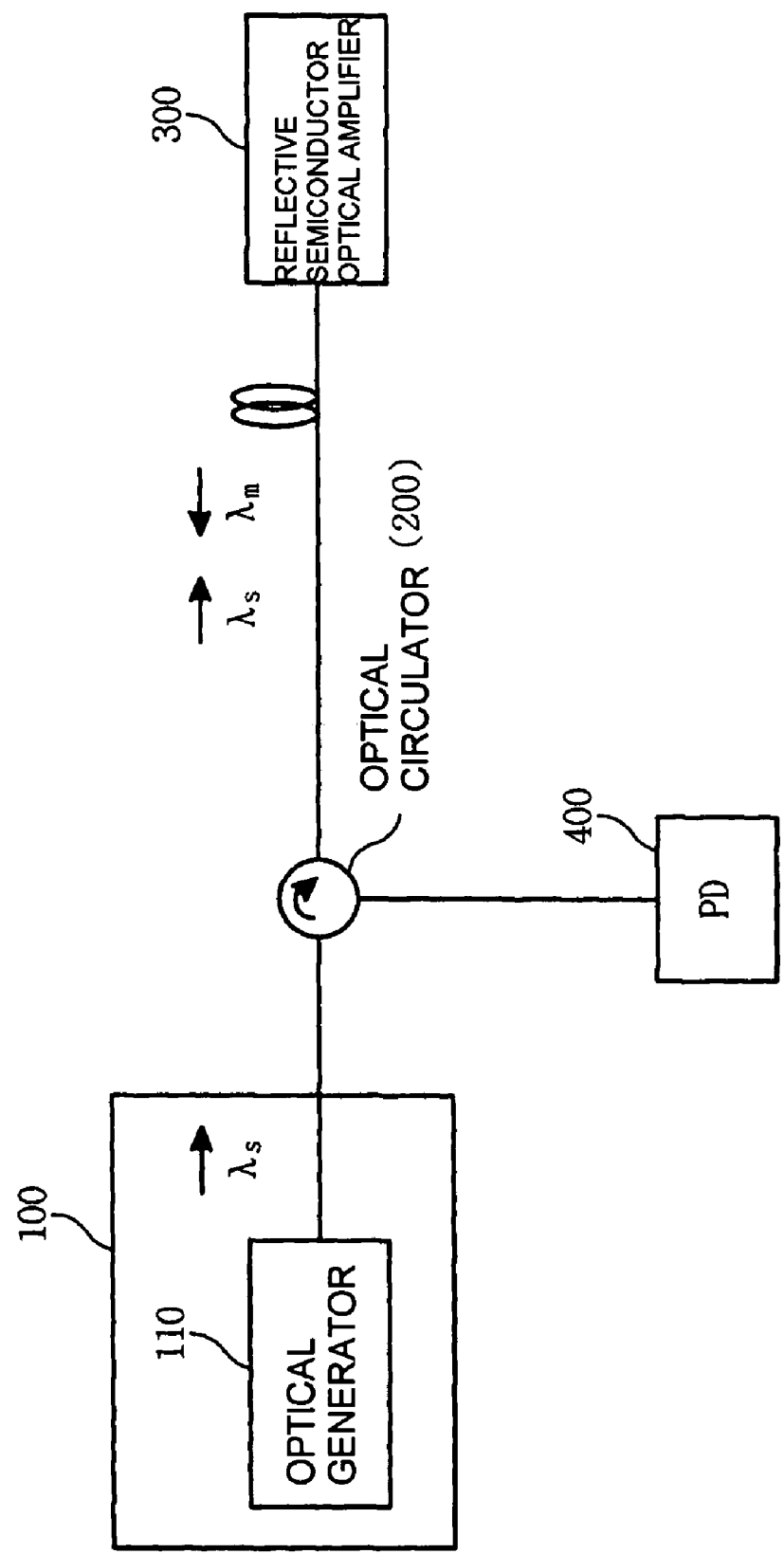
FIG. 1 is a mimetic diagram illustrating a conventional optical transmission system using a reflective semiconductor optical amplifier.
Figure 2:
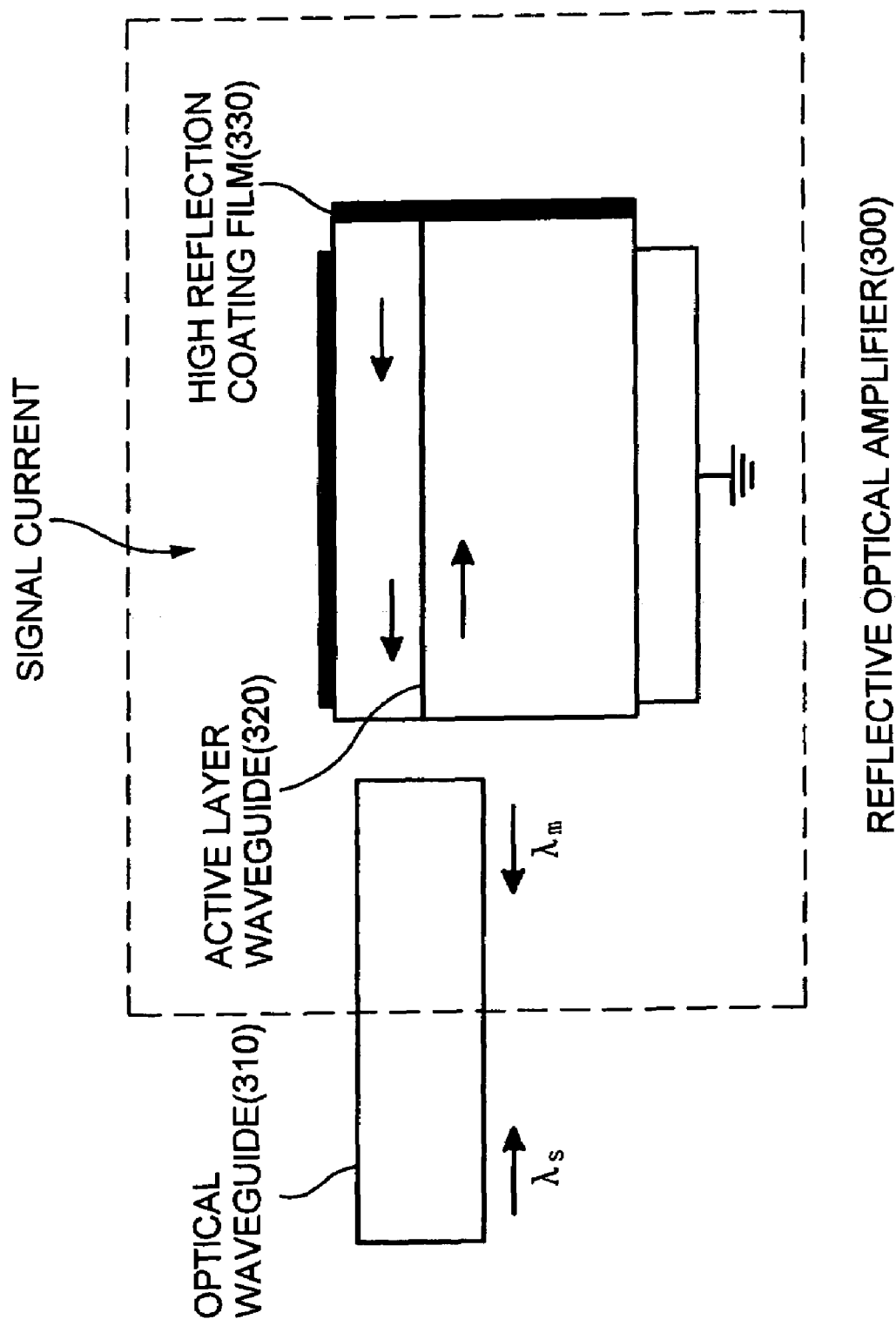
FIG. 2 is a diagram illustrating the operation principle of the reflective semiconductor optical amplifier of FIG. 1.
Figure 3:
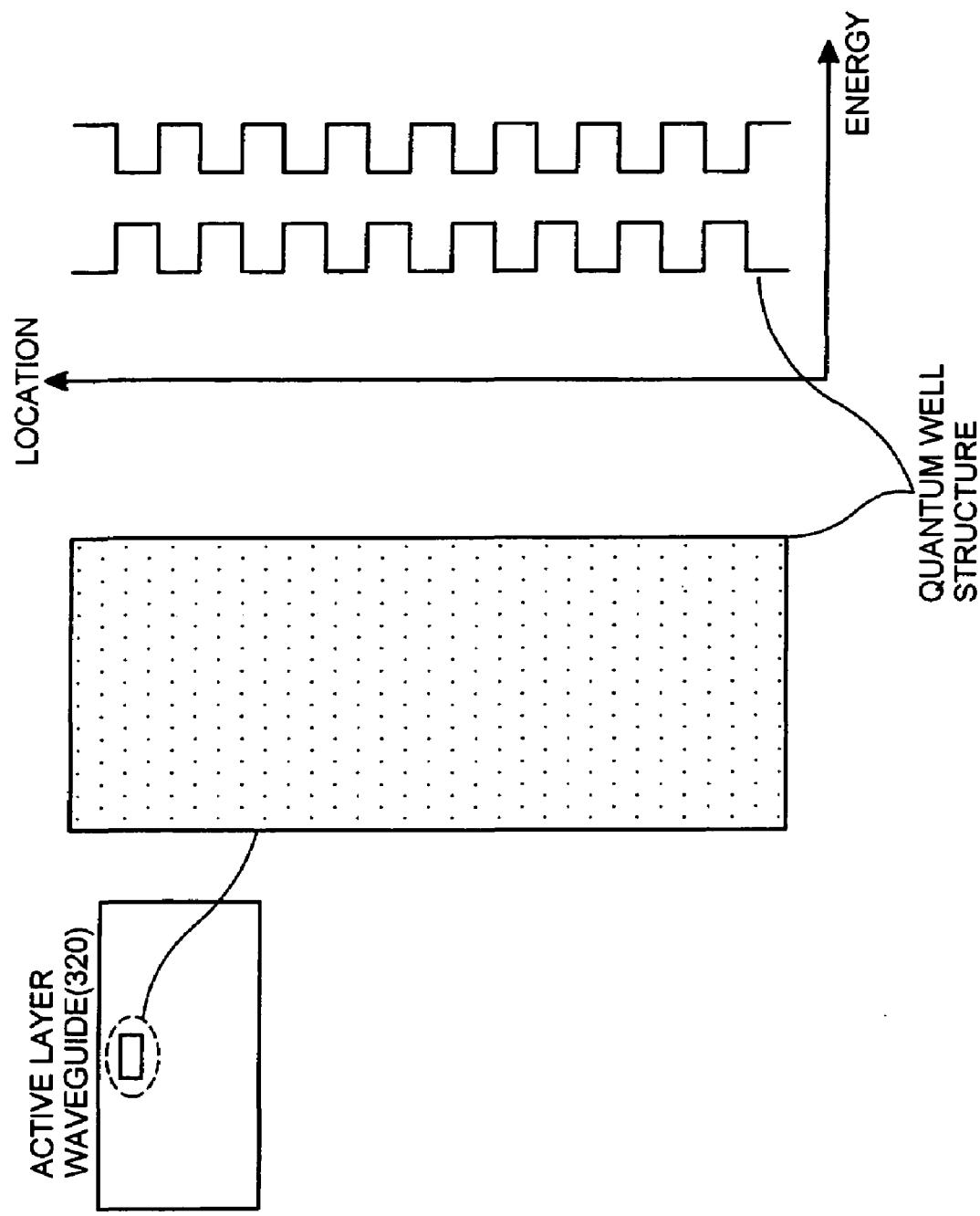
FIG. 3 is a diagram illustrating an active layer waveguide having a quantum well structure in the reflective semiconductor optical amplifier of FIG. 1.
Figure 4:
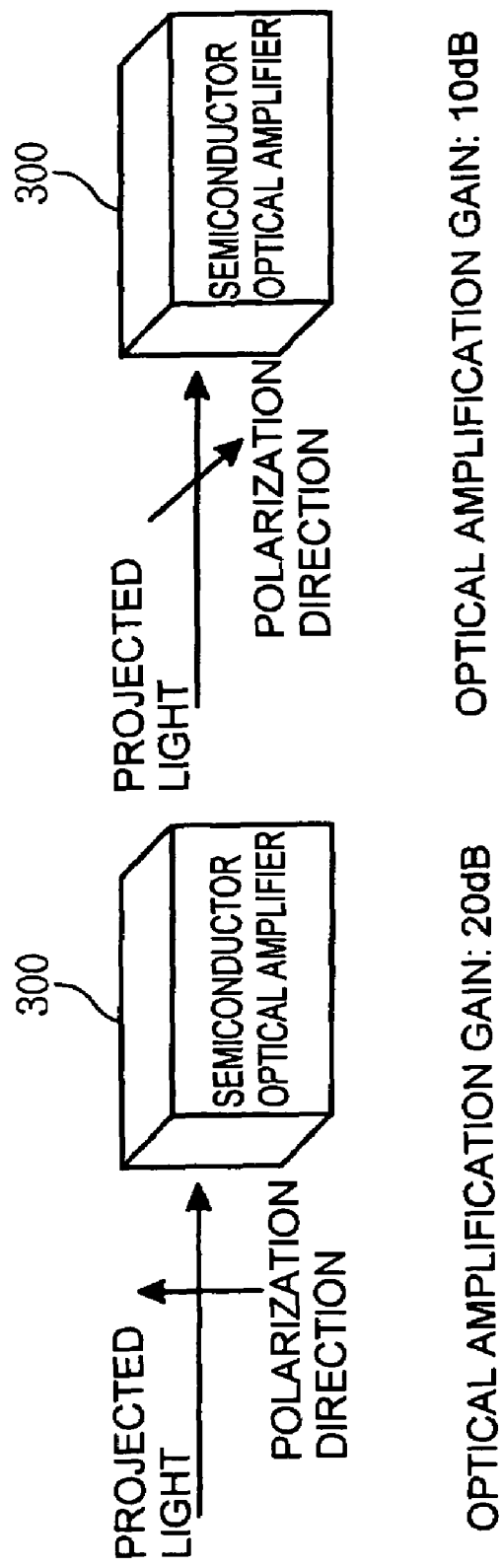
FIG. 4 is a diagram illustrating optical power amplification gain when two single mode lights each having different polarization directions are projected into the reflective semiconductor optical amplifier of FIG. 1.
Figure 5:
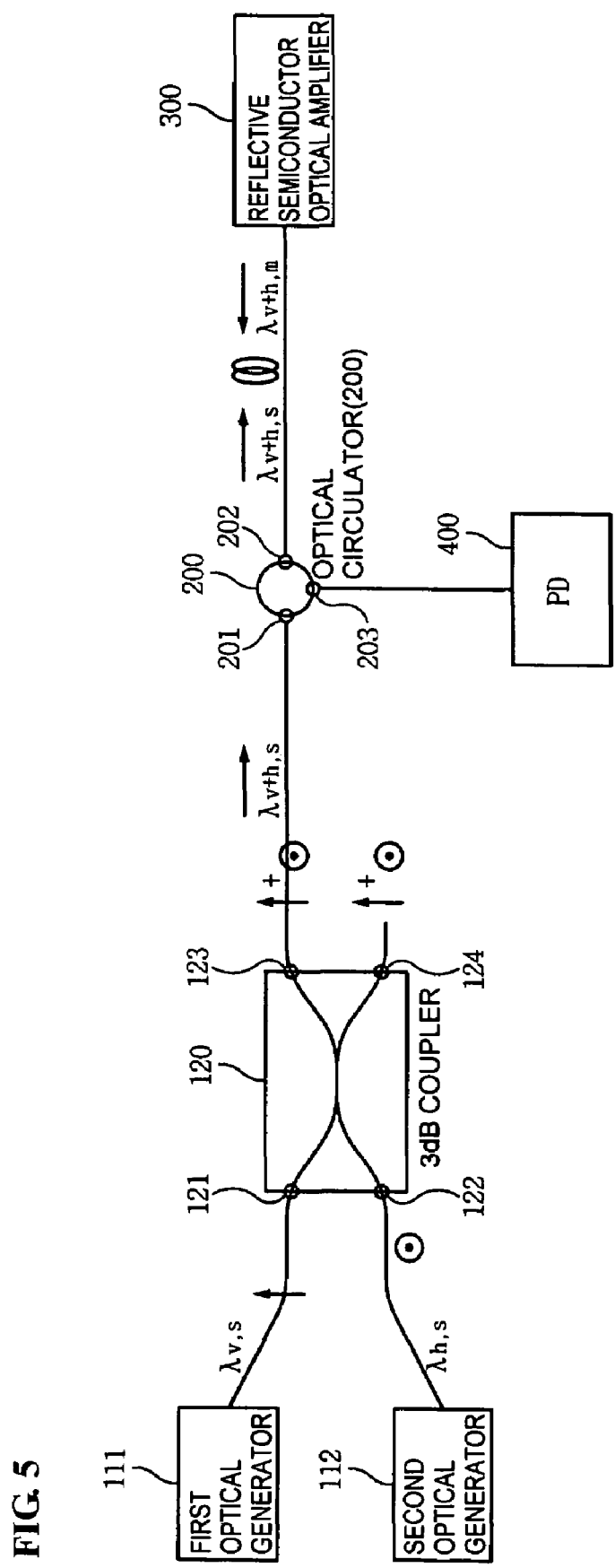
FIG. 5 is a diagram illustrating an optical communication system according to a first embodiment of the present invention.

FIG. 5 is a diagram illustrating an optical communication system according to a first embodiment of the present invention. The optical communication system of FIG. 5 is an example obtained by improving the structure of the light source 100 in the common optical communication system of FIG. 1. Hereinafter, the detailed explanation on the elements such as the optical circulator 200, the reflective semiconductor optical amplifier 300 and the photodiode 400 in the common optical communication system is omitted.

In the first embodiment, a light source 100 comprises optical generators 111 and 112, and a 3 dB coupler 120. The first optical generator 111 generates a first single mode laser light $\lambda_{v,s}$ polarized in a vertical direction through the above-described photon duplication process. In the same way, the second optical generator 112 generates a second single laser light $\lambda_{h,s}$ polarized in a horizontal direction. Here, the two laser lights $\lambda_{v,s}$ and $\lambda_{h,s}$ are orthogonal and non-interfering with each other, and have the same wavelength. The orthogonal laser lights $\lambda_{v,s}$ and $\lambda_{h,s}$ are transmitted into two input terminals 121 and 122, and then branched into two output terminals 123 and 124 in the 3 dB coupler 120, so that the laser lights $\lambda_{v,s}$ and $\lambda_{h,s}$ has a half power, respectively. The first single mode laser light $\lambda_{v,s}$ and the second single laser light $\lambda_{h,s}$ that are outputted from the output terminal 123 of the coupler 120 are mixed while they do not interfere each other, so that an orthogonal mode laser light $\lambda_{v+h,s}$ is generated.

The light for the orthogonal mode upstream signal can secure stability of the signal even when the light is modulated and amplified by a reflective semiconductor optical amplifier having polarization dependency. More specifically, the orthogonal mode laser light $\lambda_{v+h,s}$ is transmitted into a first port 210 of an optical circulator 200. Then, the orthogonal mode laser light $\lambda_{v+h,s}$ is outputted to a second port 202, and transmitted through an optical fiber into a reflective semiconductor optical amplifier. Here, the orthogonal mode laser light $\lambda_{v+h,s}$ which is transmitted through the optical fiber is deflected by θ rad. shown in FIG. 6 depending on the state of the optical fiber as described above. The deflected the orthogonal mode laser light $\lambda_{v+h,s}$ is transmitted into the reflective semiconductor optical amplifier 300 to be modulated. However, the non-uniformity of the optical amplification gain shown in the prior art is not generated even when the optical signal modulated through the reflective semiconductor optical amplifier having polarization dependency is generated.

The specific reasons will be explained with reference to FIGS. 6 and 7. First, suppose that the semiconductor optical amplifier 300 of FIG. 5 has the characteristic of FIG. 4, the powers of the single mode laser light $\lambda_{v,s}$ and $\lambda_{h,s}$ are P, an optical fiber loss is L dB, and the optical fiber has no polarization dependency. If the polarization direction of the orthogonal mode laser light $\lambda_{v+h,s}$ for an upstream signal is maintained, the power where the light polarized in the vertical and horizontal directions is projected into the optical amplifier 300 is $P/2 \cdot 10^{-L/10}$, and its electromagnetic strength is $(P/2 \cdot 10^{-L/10})^{1/2}$. Here, an optical power gain of the vertical polarization is 20 dB, and a strength gain of an electromagnetic wave is 10 dB. Therefore, the strength of the optical wave where a vertical element of the orthogonal mode laser light $\lambda_{v+h,s}$ for an upstream signal is modulated in the optical amplifier 300 is $(P/2 \cdot 10^{-L/10})^{1/2} \cdot 10^{10/10}$ that is reduced by an optical power to obtain $P/2 \cdot 10^{-L/10} \cdot 10^{20/10}$. An optical power gain of the horizontal polarization is 10 dB, and a strength gain of an electromagnetic wave is 5 dB. The optical power where a horizontal element of the orthogonal mode laser light $\lambda_{v+h,s}$ for an upstream signal is modulated in the optical amplifier 300 is $P/2 \cdot 10^{-L/10} \cdot 10^{10/10}$. As a result, the addition of the optical powers of the vertical element and the horizontal element of the modulated optical signal $\lambda_{v+h,m}$ is $P/2 \cdot 10^{-L/10} \cdot (10^{10/10} + 10^{20/10}) = P/2 \cdot 10^{-L/10} \cdot 110$.

Figure 6:
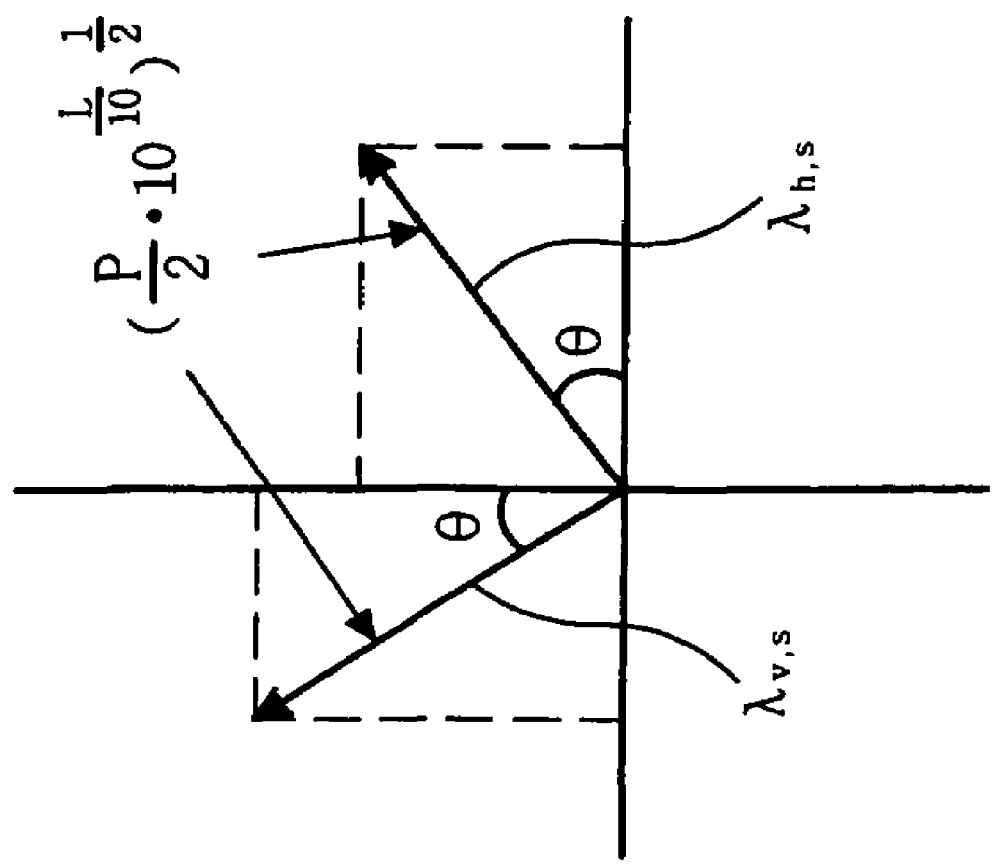
FIG. 6 is a graph illustrating an orthogonal mode light deflected by θ rad. in horizontal and vertical directions.

If the polarization direction of the orthogonal mode laser light $\lambda_{v+h,s}$ for an upstream signal is deflected by θ rad. as shown in FIG. 6 until it reaches the reflective semiconductor optical amplifier 300, the optical power of the modulated optical signal can be obtained as follows. Since the electromagnetic strength of the vertical element of the projected light $\lambda_{v+h,s}$ that is not deflected is $(P/2 \cdot 10^{-L/10})^{1/2}$, the electromagnetic strength of the vertical element of $\lambda_{v,s}$ of the projected lights in FIG. 6 is $(P/2 \cdot 10^{-L/10})^{1/2} \cdot \cos \theta$ and the electromagnetic strength of the horizontal element is $(P/2 \cdot 10^{-L/10})^{1/2} \cdot \sin \theta$. In the same way, the electromagnetic strength of the horizontal element of $\lambda_{h,s}$ of the projected lights in FIG. 6 is $(P/2 \cdot 10^{-L/10})^{1/2} \cdot \cos \theta$ and the electromagnetic strength of the horizontal element is $(P/2 \cdot 10^{-L/10})^{1/2} \cdot \sin \theta$. Meanwhile, since the optical power gain of the vertical element is 20 dB and the optical power gain of the horizontal element is 10 dB, the amplified optical power of the whole vertical elements of the projected light $\lambda_{v+h,s}$ of FIG. 6 is $P/2 \cdot 10^{-L/10} \cdot (\sin^2 \theta + \cos^2 \theta) \cdot 10^{20/10} = P/2 \cdot 10^{-L/10} \cdot 10^{20/10}$, and the amplified optical power of the whole horizontal elements of the projected light $\lambda_{v+h,s}$ of FIG. 6 is $P/2 \cdot 10^{-L/10} \cdot (\sin^2 \theta + \cos^2 \theta) \cdot 10^{20/10} = P/2 \cdot 10^{-L/10} \cdot 10^{10/10}$. As a result, the modulated optical signal has a predetermined optical power even when the projected light is deflected by a random angle and projected into the optical amplifier. In other words, the optical transmission system has a predetermined optical power gain regardless of polarization directions even when a reflective semiconductor optical amplifier having large polarization dependency is used.

Figure 7:
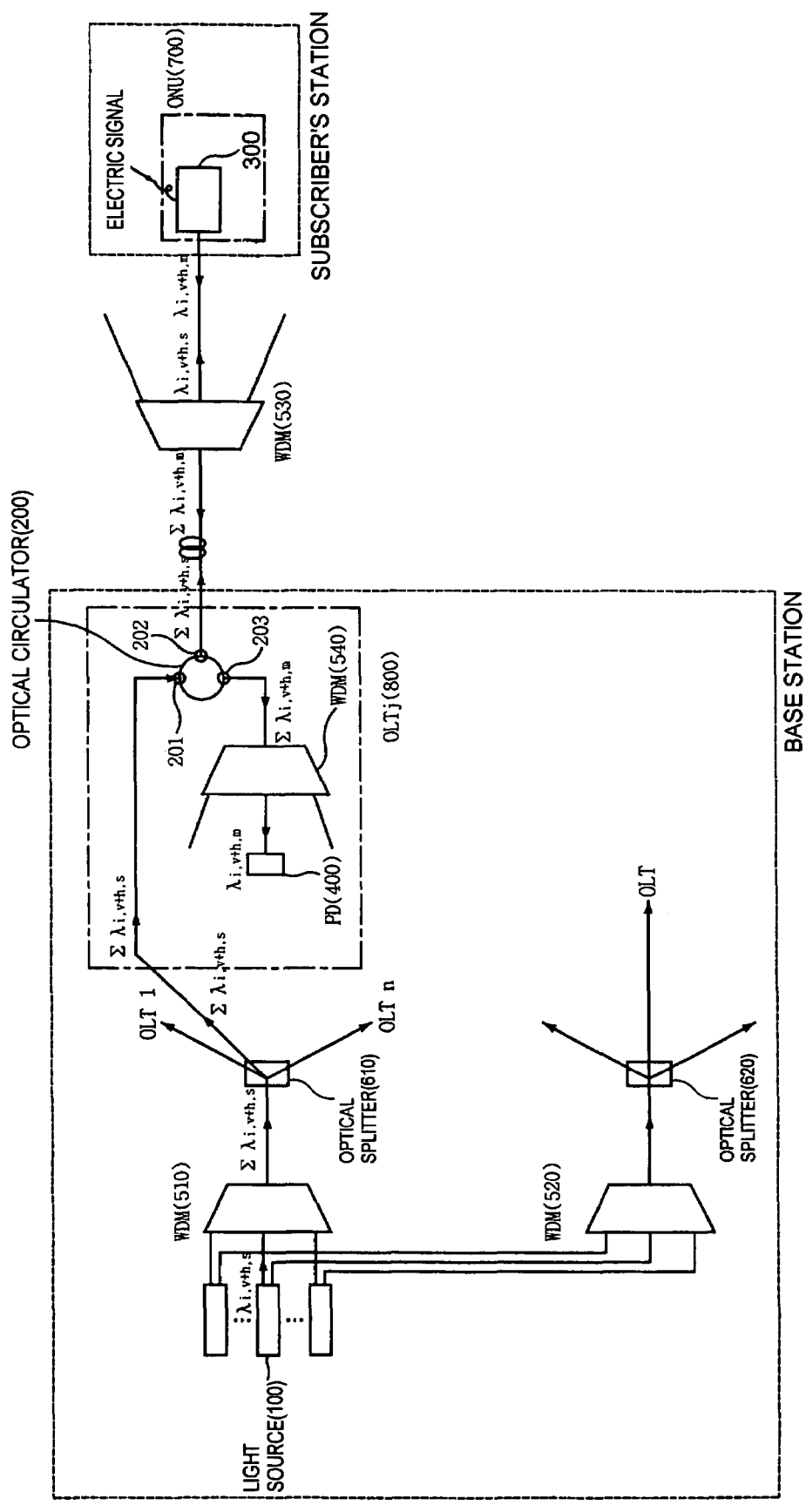
FIG. 7 is a diagram illustrating an example where the first embodiment is applied in WDM-PON.

FIG. 7 is a diagram illustrating an example where the first embodiment is applied in the WDM-PON. The two single mode laser lights that are orthogonal with each other having the same wavelength are inputted respectively into two input terminals of a 3 dB coupler, mixed as an orthogonal mode laser light having a half power, and then outputted into two output terminals of the 3 dB coupler. The orthogonal mode laser light, which is used as a light for an upstream signal, is wavelength-division-multiplexed through two WDM 510 and 520, and then transmitted into a subscriber's station. That is, the orthogonal mode laser light $\lambda_{i,v+h,s}$ generated from the light source 100 is wavelength-division-multiplexed in the WDM 500 with a light having a different wavelength which is generated for other subscribers. Thereafter, the wavelength-division-multiplexed light $\Sigma\lambda_{i,v+h,s}$ is split by a 1×n optical splitter. The split light $\Sigma\lambda_{i,v+h,s}$ for an upstream signal is transmitted into the $j^{th}$ one of a plurality of Optical Line Terminals (hereinafter, referred to as "OLT") in a base station. Then, the split light $\Sigma\lambda_{i,v+h,s}$ for an upstream signal is transmitted into the WDM 530 at the subscriber's side through the first port 201 and the second port 202 in the optical circulator 200 so that lights may be separated in each subscriber, and transmitted into an Optical Network Unit (hereinafter, referred to as "ONU") 700 of the $i^{th}$ subscriber. The light $\Sigma\lambda_{i,v+h,s}$ for an upstream signal is projected into the reflective semiconductor optical amplifier 300 in the ONU 700. An upstream optical signal $\lambda_{i,v+h,m}$ generated from the reflective semiconductor optical amplifier 300 is transmitted into the WDM 530 through the optical fiber where the light $\lambda_{i,v+h,s}$ for an upstream signal is transmitted, wavelength-division-multiplexed with upstream optical signals of other subscribers by the WDM 530, and then transmitted into an OLT 800 of the base station. The wavelength-division-multiplexed upstream optical signal $\Sigma\lambda_{i,s+h,m}$ is projected into the second port 202 of the optical circulator 200 in the OLT 800, and then outputted into a third port 203. After the outputted upstream optical signal $\Sigma\lambda_{i,v+h,m}$ is split in each subscriber in the WDM 540, the optical signal $\Sigma\lambda_{i,v+h,m}$ is transmitted into the photodiode 400 and converted into an electric signal.

Figure 8:
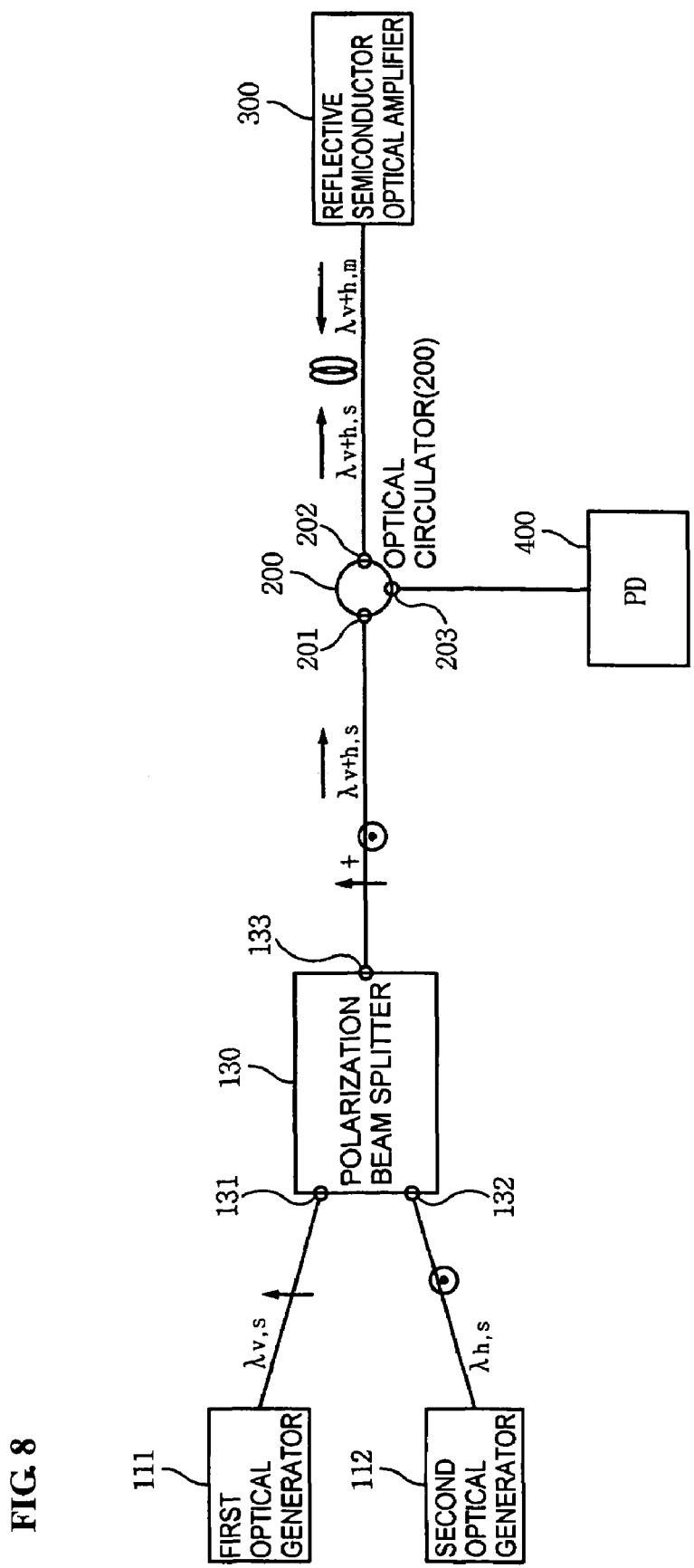
FIG. 8 is a diagram illustrating an optical communication system according to a second embodiment of the present invention.

FIG. 8 is a diagram illustrating an optical communication system according to a second embodiment of the present invention. The light source 100 also comprises optical generators 111 and 112 like in the first embodiment, and single mode laser lights that are orthogonal with each other are generated. The single mode laser lights $\lambda_{v,s}$ and $\lambda_{h,s}$ are inputted in output terminals 141 and 142 of a Polarization Beam Splitter (hereinafter, referred to as "PBS") 130, and outputted to an input terminal of the PBS 130. Unlike the first embodiment, a light $\lambda_{v+h,s}$ is obtained by mixing lights $\lambda_{v,s}$ and $\lambda_{h,s}$ which have initial optical powers. Thereafter, the same process where the light $\lambda_{v+h,s}$ is outputted to the optical circulator 200, modulated in the optical amplifier and then converted into an electric signal in the photodiode of the first embodiment is repeated in the second embodiment. The second embodiment can be used in the same optical communication network such as the WDM-PON like the first embodiment.

As described above, in an optical transmission system and a method thereof according to an embodiment of the present invention, even when an optical modulator having polarization dependency like a reflective semiconductor optical amplifier in an optical transmission network is used, a constantly amplified optical signal can be obtained regardless of deflection of a light inputted in the optical modulator, which results in stable optical transmission.

While the invention is susceptible to various modifications and alternative forms, specific embodiments have been shown by way of example in the drawings and described in detail herein. However, it should be understood that the invention is not limited to the particular forms disclosed. Rather, the invention covers all modifications, equivalents, and alternatives falling within the spirit and scope of the invention as defined in the appended claims.

What is claimed is:

1. An optical communication system comprising:
    a first optical generator and a second optical generator for generating a first single mode light and a second single mode light, respectively, wherein the first single mode light and the second single mode light are orthogonal and non-interfering with each other for the signal transmission, and exist in the same communication channel;
    a mixing means that mixes the first single mode light and the second single mode light to output a mixed light of orthogonally polarized modes;
    an optical fiber that delivers the mixed light from the mixing means and gives a random polarization to the mixed light; and
    reflective optical modulator that has a single in/out port and a polarization-dependent characteristic in optical amplification gain, amplifies and modulates the mixed light after receiving the mixed light from the optical fiber, produces a constantly amplified optical signal regardless of the random polarization of the mixed light in spite of the polarization-dependent characteristic, and reflects the optical signal back toward the optical fiber through the single in/out port.

2. The optical communication system according to claim 1, wherein the mixing means is a 3 dB coupler.

3. The optical communication system according to claim 1, wherein the mixing means is a polarization beam splitter.

4. An optical communication method comprising:
    a first step of generating a first single mode light and a second single mode light, wherein the first single mode light and the second single mode light are orthogonal and non-interfering with each other for the signal transmission, and exist in the same communication channel;
    a second step of mixing the first single mode light and the second single mode light to generate a mixed light of orthogonally polarized modes;
    a third step of delivering the mixed light through an optical fiber that gives a random polarization to the mixed light;
    a fourth step of receiving the mixed light by a reflective optical modulator that is connected with the optical fiber and has a single in/out port with a polarization-dependent characteristic in optical amplification gain; and
    a fifth step of amplifying and modulating the mixed light by the reflective optical modulator so as to produce a constantly amplified optical signal regardless of the random polarization of the mixed light in spite of the polarization-dependent characteristic, and then reflecting the optical signal back toward the optical fiber through the single in/out port.

5. The optical communication system according to claim 4, wherein the mixing means is a 3 dB coupler.

6. The optical communication system according to claim 4, wherein the mixing means is a polarization beam splitter.

* * * * *